United States Patent [19]

Muzslay

[11] 4,376,922
[45] Mar. 15, 1983

[54] FILTER CONNECTOR

[75] Inventor: Steven Z. Muzslay, Huntington Beach, Calif.

[73] Assignee: ITT, New York, N.Y.

[21] Appl. No.: 200,051

[22] Filed: Oct. 23, 1980

[51] Int. Cl.³ .................. H03H 7/01; H01R 13/66
[52] U.S. Cl. ............................ 333/182; 333/183; 333/185; 339/147 R
[58] Field of Search ............... 333/167, 181–185; 339/147 R, 176 MP, 147 C

[56] References Cited

U.S. PATENT DOCUMENTS

| | | | |
|---|---|---|---|
| 3,172,718 | 3/1965 | LaLonde | 339/176 MP |
| 3,243,761 | 3/1966 | Piorunneck | 339/176 MP |
| 3,646,504 | 2/1972 | Classon | 339/176 MP |
| 3,764,955 | 10/1973 | Ward | 339/176 MP |
| 3,783,433 | 1/1974 | Kurtz et al. | 339/176 MP |

Primary Examiner—Marvin L. Nussbaum
Attorney, Agent, or Firm—T. E. Kristofferson; T. L. Peterson; A. D. Stolzy

[57] ABSTRACT

A filter connector is disclosed in which the insulator thereof contains a slot which is parallel to and intersects a row of contact cavities in the insulator. A monolithic capacitor is mounted in the slot with its live electrodes aligned with and facing the contact cavities. A contact in each cavity embodies an integral outwardly extending spring finger which engages one of the electrodes on the capacitor. A rear insulator retains the contacts and capacitor in the cavities and slot, respectively.

5 Claims, 5 Drawing Figures

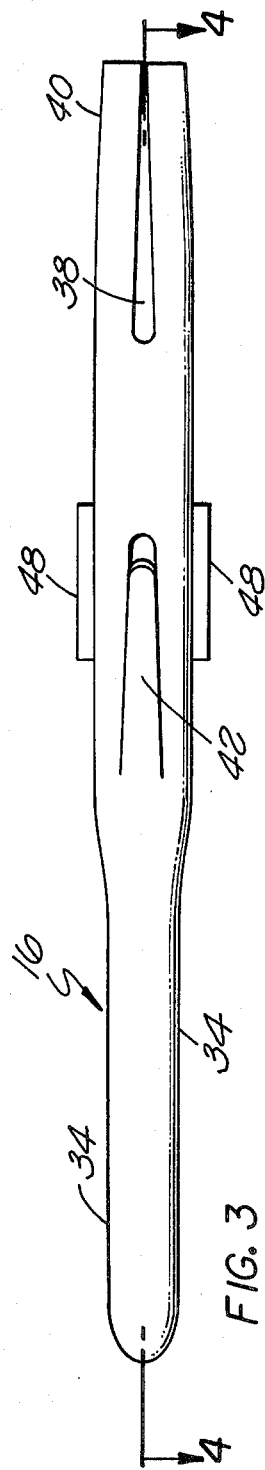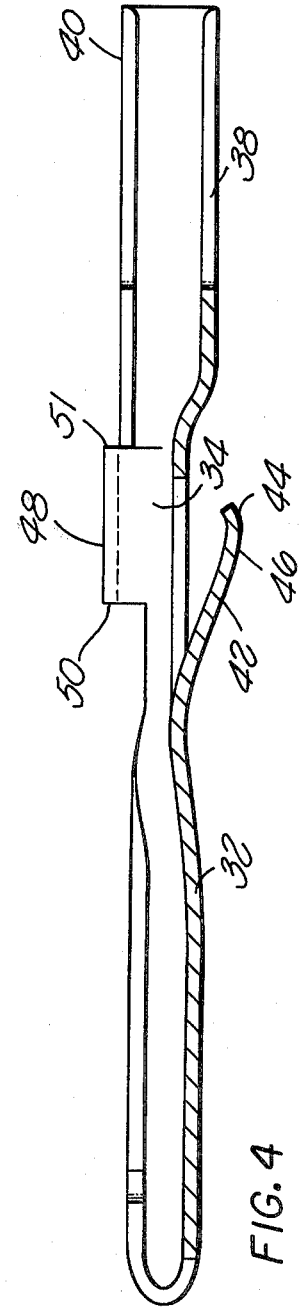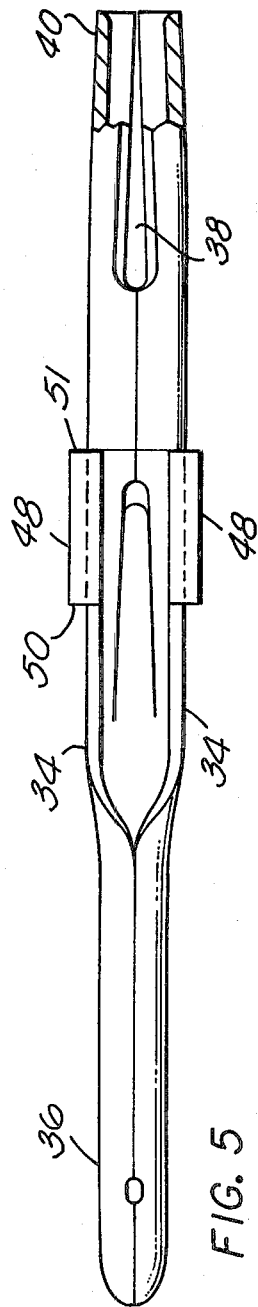

FILTER CONNECTOR

CROSS-REFERENCE TO RELATED APPLICATION

This application discloses a connector which is a modification of a connector disclosed in copending application of Samuel T. Brancaleone, Ser. No. 198,295, filed Oct. 20, 1980, now U.S. Pat. No. 4,371,226, Entitled "Filter Connector and Method of Assembly Thereof," assigned to the same assignee as the present application.

BACKGROUND OF THE INVENTION

The present invention relates generally to an electrical connector and, more particularly, to a filter electrical connector.

As explained in U.S. Pat. No. 4,126,840 to Selvin, assigned to the assignee of the present application, a problem which is frequently encountered by users of electronic equipment is that of electromagnetic interference (EMI). Such interference may be reduced by utilizing filtered connectors with such electronic equipment. The aforementioned Selvin patent discloses a unique filter connector arrangement utilizing a monolithic capacitor which is mounted between two rows of contacts in an electrical connector. The contacts are electrically connected to the parallel, spaced live electrodes on the capacitor by soldering. Thereafter the contacts and capacitor are encapsulated by a potting compound. The use of solder and potting usually yields a lower reliability assembly that is non-repairable and requires a high degree of process control to produce.

To avoid the requirement of soldering and potting of the parts, the filter connector disclosed in the aforementioned Brancaleone application was devised. As disclosed therein, the Brancaleone filter connector comprises a front insulator which is shaped to house a monolithic capacitor within a slot bordered by spaced rows of contact cavities. A thin metallic plate, or spring array, is positioned against the rear of the front insulator so that a plurality of spring tabs on the spring array project inwardly into the insulator slot and a plurality of spring tines on the spring array project inwardly into correspondingly aligned contact cavities. The capacitor is then inserted into the slot so that external electrodes thereon contact the spring tabs. A contact is inserted into each contact cavity, causing a spring tine on the array to deflect and make contact therewith. Thus, each spring tine-tab element provides electrical connection between a contact and a corresponding electrode on the capacitor. A rear insulator is then mounted against the spring array to sandwich the spring array between the front and rear insulators. The rear insulator embodies a rib which breaks portions of the spring array and thereby isolates each spring element of the array.

The object of the present invention is to provide a filter connector utilizing a monolithic capacitor similar to the Brancaleone connector but which requires fewer parts, is simpler to assemble and in which the parts are not prone to damage during assembly or handling, thereby reducing overall cost of the final product.

SUMMARY OF THE INVENTION

According to a principal aspect of the present invention, there is provided a filter connector comprising an insulator body having at least one row of contact cavities therein and a slot parallel to the row of cavities intersecting the cavities whereby the cavities are transversely open to the slot. A monolithic capacitor similar to that disclosed in the aforementioned Brancaleone application and Selvin patent is mounted in the slot, with its live electrodes aligned with and facing the contact cavities. An electrical contact in each cavity has an integral outwardly extending spring finger which engages one of the electrodes on the capacitor. Since the spring finger is an integral part of the contact, a separate spring element or spring array is not required as in the aforementioned Brancaleone connector thereby eliminating such part and the additional step of assembling thereof.

BRIEF DESCRIPTION OF THE DRAWINGS

FIG. 3 is a top plan view of one of the contacts utilized in the connector of the present invention;

FIG. 4 is a vertical sectional view taken along line 4—4 of FIG. 3; and

FIG. 5 is a bottom view of the contact.

DESCRIPTION OF THE PREFERRED EMBODIMENT

Figure 1:
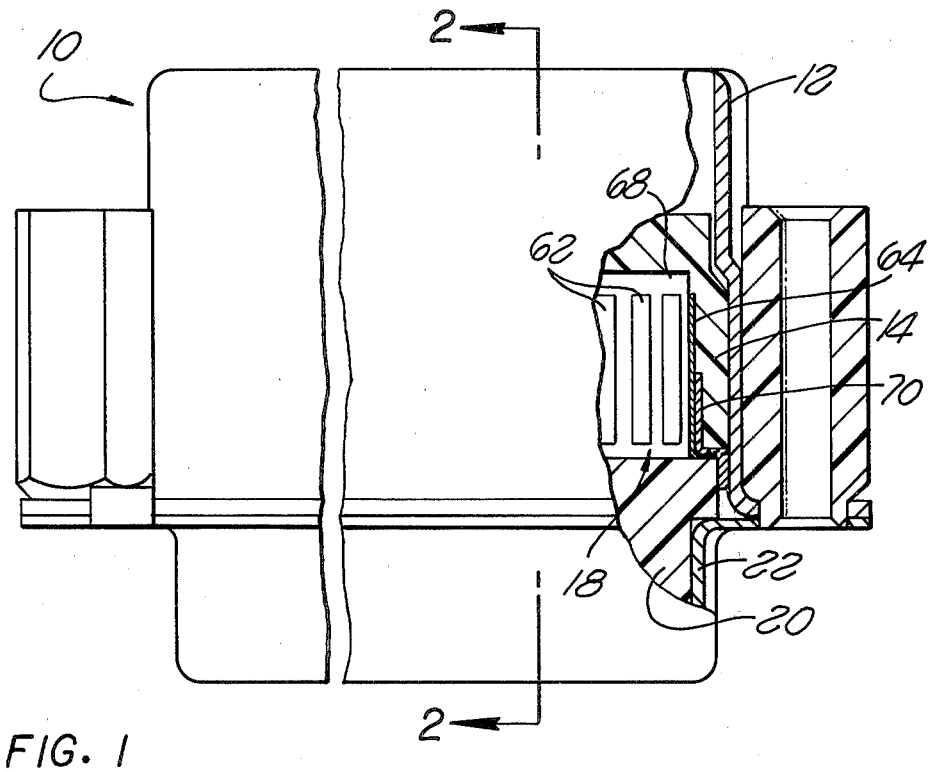
FIG. 1 is a top plan view of the connector of the present invention, shown in partial section to illustrate the interior parts thereof.
Figure 2:
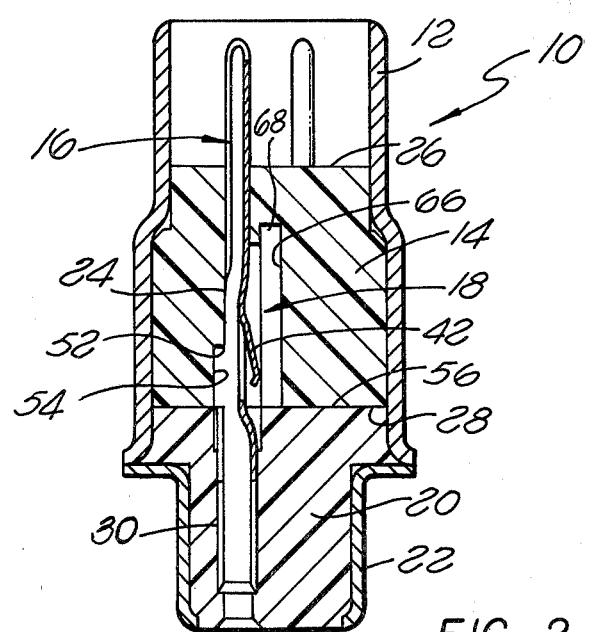
FIG. 2 is a longitudinal sectional view through the connector of FIG. 1 taken along line 2—2.

Referrring now to FIGS. 1 and 2 in detail, there is illustrated the preferred embodiment of the filter connector of the present invention, generally designated 10. The connector comprises a front shell 12, a front insulator 14, contacts 16, a monolithic capacitor 18, a rear insulator 20 and a rear shell 22.

The front insulator 14 contains two rows of contact cavities 24, only one of such cavities being seen in FIG. 2. The cavities extend from the front face 26 to the rear surface 28 of the insulator. The rear insulator 20 contains two rows of bores 30 which are aligned with the contact cavities 26 and form rearward extensions thereof.

As best seen in FIGS. 3–5, each contact 16 is shown as being in the form of a pin contact, although it could be formed as a socket contact. The contact is stamped from resilient sheet metal, such as beryllium copper, and formed into the configuration illustrated in FIGS. 3–5. The body of the contact has a generally U-shaped configuration providing a base 32 and a pair of sidewalls 34. The forward portions of the sidewalls are bent and formed to provide a forward cylindrical pin contacting section 36. The rear portions of the sidewalls are likewise formed in cylindrical form, slotted as indicated at 38 and formed in a conventional manner to provide a rear termination portion 40 in the form of a socket contact. The rear termination portion may have other constructions, such as a wire-wrappable tail, a crimp barrel, etc.

A resilient spring finger 42 is stamped from the base 32 of the contact body and bent outwardly (downwardly as viewed in FIG. 4). The terminal end 44 of the finger 42 is reversely bent to provide a curved outer contacting surface 46 on the finger 42.

Intermediate portions of the sidewalls 34 of the contact body opposite to the finger 42 extend upwardly and outwardly to provide contact retention flanges 48. Each flange provides a front shoulder 50 and a rear shoulder 51. When the contact 16 is mounted in its cavity 24 in the front insulator, the front shoulder 50 on each flange 48 engages a rearwardly facing shoulder 52 provided by an enlarged rear section 54 of the contact cavity. With the contact fully seated in the cavity 24 and the shoulder 50 engaging the shoulder 52 in the cavity, the rear shoulder 51 on the flange is essentially flush with the rear surface 28 of the front insulator. Thus, when the rear insulator 20 is mounted flush with the front insulator, the front surface 56 thereof abuts the rear shoulder 51 on each contact retention flange 48 thereby retaining the contact axially within the insulator assembly.

The monolithic capacitor 18 comprises a rectangular ceremic substrate 60 having longitudinally extending spaced live electrodes 62 on its upper and lower surfaces. Ground electrodes 64 are formed on the side edges of the substrate. The live electrodes are spaced apart a distance corresponding to the spacing of the contacts in the two rows of cavities 24 in the front insulator. A pair of ground planes, not shown, embedded in the substrate are joined to the respective ground electrodes 64. Reference may be made to the aforementioned Selvin patent for a more detailed description of the monolithic capacitor, and possible variations in the construction thereof.

An elongated slot 66 is formed in the front insulator 14 disposed parallel to and between the two rows of contact cavities. The inner end 68 of the slot terminates prior to the front face 26 of the front insulator. The slot opens at the rear surface 28 of the insulator. In addition, the slot intersects each of the contact cavities 24 so that each cavity is open transversely to the slot.

The slot is dimensioned to slidably receive the capacitor 18 therein, and is so located that the live electrodes 62 of the capacitor will be aligned with the contacts 16 mounted in the cavities 24 in the front insulator. Thus, with the contacts mounted in the cavities in the position illustrated in FIG. 2, and with the capacitor 18 mounted in the slot 66, the spring finger 42 of each contact will engage a respective one of the live electrodes 62 on the face of the capacitor. Thus, the integral spring fingers 42 on the contacts provide the required electrical connections between the contact bodies and the live electrodes on the capacitor 18. A right-angle spring 70 at each end of the slot 66 provides electrical connection between ground electrodes 64 on the capacitor and the shell 12.

To assemble the connector 10, initially the ground springs 70 are inserted into the opposite ends of the slot 66 and the monolithic capacitor 18 is slid into the slot. Then the contacts 16 are mounted in the cavities 24 whereby the spring fingers 42 thereon will engage the live electrodes on the opposite faces of the capacitor. The rear insulator is then mounted over the rear termination portions 40 of the contacts and the resulting assembly is installed in the front shell 12 causing the outwardly extending legs of the right-angle springs 70 to bend into the configuration shown in FIG. 1. Thereafter, the rear shell 22 is mounted over the rear insulator and secured to the front insulator by suitable means, not shown, to complete the assembly.

Because the terminal ends 44 of the spring fingers 42 of the contacts are bent inwardly providing curved outer contacting surfaces 46, the capacitor 18 may be removed and replaced without scoring the electrodes thereon. Also, in the assembly of the connector, the contacts could be initially mounted into the cavities 24 and thereafter the capacitor may be inserted into the slot 66 without any damage occuring to the electrodes thereon.

Thus, by the present invention, by making the slot which receives the monolithic capacitor intersect the contact cavities, and forming the contacts with integral spring fingers thereon, electrical connection may be conveniently made between the contacts and the electrodes on the capacitor without the necessity of utilizing separate spring elements. The contacts are relatively simple in form and inexpensive to manufacture. Thus, the connector of the present invention may be manufactured at relatively low cost.

What is claimed is:

1. An electrical connector comprising:
   an insulator body having at least one row of contact cavities therein;
   said insulator body comprising a front insulator and a rear insulator, said front insulator having a front face and a rear face, said rear insulator being mounted against said rear face;
   said cavities extending through said front and rear insulators;
   a slot in said front insulator opening to said rear face but terminating short of said front face providing a rearwardly facing stop shoulder, said slot being parallel to said row of cavities and intersecting said cavities whereby said cavities are open transversely to said slot;
   a monolithic electronic element in said slot, said element being inserted into said slot from the rear of said front insulator when said rear insulator is separate from said front insulator;
   said rear insulator retaining said element in said slot;
   said element comprising a substrate having a plurality of parallel, spaced live electrodes on an outer face thereof facing in the direction of said cavities and aligned therewith; and
   an electrical contact in each of said cavities, each said contact having a forward tubular mating section adjacent to said front face and an integral laterally outwardly extending spring finger behind said mating section engaging a respective one of said electrodes.

2. A filter connector as set forth in claim 1 wherein:
   each said contact comprises a stamped and formed contact body having a U-shaped section providing a base and a pair of sidewalls;
   said spring finger being stamped from said base and bent outwardly at an angle relative to the longitudinal axis of said body;
   said sidewalls embodying at least one outwardly extending retention flange defining front and rear shoulders; and
   each said contact cavity embodies a rearwardly facing abutment surface engageable with said front shoulder of its respective contact and said rear insulator embodies a forwardly facing abutment surface engageable with said rear shoulder for restricting axial movement of said contact in said cavity.

3. An electrical connector comprising:
   an insulator body having at least one row of contact cavities therein, and a front face and a rear face;
   a slot in said body parallel to said row of cavities and intersecting said cavities whereby said cavities are open transversely to said slot, said slot terminating short of said front and rear faces;

a monolithic electronic element mounted entirely within said slot;

said element comrising a substrate having a plurality of parallel, spaced live electrodes on an outer face thereof facing in the direction of said cavities and aligned therewith;

an electrical pin or socket contact in each of said cavities, each said contact having an integral laterally outwardly extending spring finger engaging a respective one of said electrodes;

each said contact comprising a stamped and formed tubular body having a forward tubular mating section adjacent to said front face, said spring finger being stamped from the wall of said body behind said mating section and bent outwardly at an angle relative to the longitudinal axis of said body.

4. A filter connector as set forth in claim 3 wherein:

said spring finger extends rearwardly from said body, the end of said finger being bent inwardly to provide a generally smooth contacting surface engaging said electrode.

5. A filter connector comprising:

an insulator body having at least one row of contact cavities therein, and a front face and a rear face;

a slot in said body parallel to said row of cavities and intersecting said cavities whereby said cavities are open transversely to said slot, said slot terminating short of said front and rear faces;

a monolithic capacitor mounted entirely within said slot;

said capacitor comprising a dielectric substrate having a plurality of parallel, spaced live electrodes on an outer face thereof facing in the direction of said cavities and aligned therewith; and a tubular pin or socket contact in each of said cavities, each said contact having a forward tubular mating section adjacent to said front face and an integral laterally outwardly extending spring finger behind said mating section engaging a respective one of said electrodes.

* * * * *

UNITED STATES PATENT OFFICE
CERTIFICATE OF CORRECTION

PATENT NO. : 4,376,922
DATED : March 15, 1983
INVENTOR(S) : Steven Z. Muzslay

It is certified that error appears in the above-identified patent and that said Letters Patent are hereby corrected as shown below:

ON THE TITLE PAGE ITEM [73], should read as follows:

---Assignee: International Telephone and
             Telegraph Corporation
             New York, N.Y. ---

Signed and Sealed this

Sixteenth Day of August 1983

[SEAL]

Attest:

Attesting Officer

GERALD J. MOSSINGHOFF

Commissioner of Patents and Trademarks